United States Patent
Dow

(10) Patent No.: US 12,427,876 B2
(45) Date of Patent: Sep. 30, 2025

(54) APPARATUS FOR CHARGING AND DISCHARGING BATTERY OF ELECTRIC AIR VEHICLE

(71) Applicant: HYUNDAI MOBIS Co., Ltd., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 707 days.

(21) Appl. No.: 17/825,319

(22) Filed: May 26, 2022

(65) Prior Publication Data

US 2023/0064812 A1 Mar. 2, 2023

(30) Foreign Application Priority Data

Aug. 19, 2021 (KR) .................. 10-2021-0109629

(51) Int. Cl.
| | |
|---|---|
| *H02J 7/00* | (2006.01) |
| *B60L 53/126* | (2019.01) |
| *B60L 53/30* | (2019.01) |
| *B60L 53/66* | (2019.01) |

(52) U.S. Cl.
CPC .......... *B60L 53/126* (2019.02); *B60L 53/305* (2019.02); *B60L 53/66* (2019.02); *B60L 2200/10* (2013.01); *B60Y 2200/91* (2013.01)

(58) Field of Classification Search
USPC ................................................. 320/108, 109
See application file for complete search history.

(56) References Cited

U.S. PATENT DOCUMENTS

| | | | | |
|---|---|---|---|---|
| 2011/0266871 | A1* | 11/2011 | Thisted ............... | H02J 7/34 307/46 |
| 2019/0025830 | A1* | 1/2019 | O'Brien ............... | B60L 53/36 |
| 2020/0185944 | A1* | 6/2020 | Park .................... | B60L 58/14 |
| 2020/0254897 | A1* | 8/2020 | Loghavi ............... | B60L 53/67 |
| 2020/0262305 | A1* | 8/2020 | Chakraborty ........ | B60L 53/57 |
| 2021/0046831 | A1* | 2/2021 | Kim ..................... | B60L 53/35 |

FOREIGN PATENT DOCUMENTS

CN 107554317 A 1/2018

OTHER PUBLICATIONS

"Road Vehicles—Vehicle-to-Grid Communication Interface—Part 2: Network and application protocol requirements," (2014): ISO 15118-2:2014.
SS-EN ISO 15118-1:2019, "Road vehicles—Vehicle to grid communication interface—Part 1: General information and use-case definition", SEK Svensk Elstandard (2019).
Chinese Office Action issued on Mar. 20, 2025, in corresponding Chinese Patent Application No. 202210716924.6. (9pages in Chinese).

* cited by examiner

*Primary Examiner* — Samuel Berhanu
(74) *Attorney, Agent, or Firm* — NSIP Law

(57) ABSTRACT

An apparatus for charging a battery of an electric air vehicle includes a transceiver to perform wireless communication with an access point connected to supply equipment, an on-board charger connected to the transceiver, and a high-voltage battery charged based on control by the on-board charger. The on-board charger exchanges information, associated with charging reservation, with the supply equipment via the transceiver and the access point based on a first wireless communication scheme and exchanges information, associated with a charging performance state, with the supply equipment based on a second wireless communication scheme.

4 Claims, 9 Drawing Sheets

APPARATUS FOR CHARGING AND DISCHARGING BATTERY OF ELECTRIC AIR VEHICLE

CROSS-REFERENCE TO RELATED APPLICATIONS

This application claims the benefit of the Korean Patent Application No. 10-2021-0109629 filed on Aug. 19, 2021, which is hereby incorporated by reference as if fully set forth herein.

BACKGROUND

Field of the Invention

The present invention relates to technology for a charging method of a battery embedded in an electric air vehicle for urban air mobility (UAM)

Discussion of the Related Art

A three-dimensional (3D) traffic system called urban air mobility (UAM) is attracting much attention as a next-generation traffic means for fundamentally solving a traffic problem of cities.

Air vehicles for UAM which are being currently developed include an electric motor which generates power on the basis of electric energy supplied from a high-voltage battery and a plurality of rotors configured by the electric motor, so that a passenger or a plurality of passengers is/are possible to board a corresponding air vehicle and vertical takeoff and landing and flight are possible.

Like a battery equipped in an electric vehicle, a battery equipped in an air vehicle for UAM should be possible to be charged, and such charging may be performed while passengers are getting on and off the air vehicle at a place at which the air vehicle for UAM takes off or lands.

Furthermore, in the field of electric vehicles, a charging-related communication interface between vehicles and a charging station has been established based on International Standard, but in UAM technology which is being developed currently, a discussion of a charging-related communication interface between air vehicles for UAM and a charging station is insufficient. In addition, a discussion of a discharging-related communication interface between air vehicles for UAM and a charging station is insufficient also.

Details described as the background technology is merely for promoting understanding of the background of the invention, and it should not be construed to recognize that the background technology corresponds to the related art known to those skilled in the art in the technical field.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present invention is directed to providing an apparatus for charging and discharging a battery of an electric air vehicle.

In one general aspect, an apparatus for charging a battery of an electric air vehicle includes: a transceiver configured to perform wireless communication with an access point connected to supply equipment; an on-board charger connected to the transceiver; and a high-voltage battery charged based on control by the on-board charger, wherein the on-board charger is configured to exchange information, associated with charging reservation, with the supply equipment via the transceiver and the access point based on a first wireless communication scheme and to exchange information, associated with a charging performance state, with the supply equipment based on a second wireless communication scheme.

The first wireless communication scheme may be any one of or any combination of long term evolution (LTE) communication, 4th generation (4G) communication, 5th generation (5G) communication, and satellite communication, and the second wireless communication scheme may be wireless local area network (WLAN) communication.

The information associated with the charging reservation may include occupation information received from the access point, and the occupation information may include state information representing whether another electric air vehicle is being charged by using the supply equipment.

The information associated with the charging reservation may include: a request message requesting charging standby time information transferred to the supply equipment; and the charging standby time information received as a response message corresponding to the request message from the supply equipment via the access point.

The information associated with the charging reservation may include: a message requesting use permission of the supply equipment from the supply equipment via the access point; and a message representing the use permission and not permission, the message being a response message corresponding to the message requesting the use permission.

The information associated with the charging reservation may include: a charging reservation request message transferred to the supply equipment via the access point, the charging reservation request message including information associated with a charging reservation time and a target depth of charge; and a message received from the supply equipment via the access point, the message being a charging reservation completion message representing that charging reservation is completed.

The information associated with the charging performance state may include information associated with charging start, in charging, and charging completion.

In another general aspect, an apparatus for discharging a battery of an electric air vehicle includes: a transceiver configured to perform wireless communication with an access point connected to supply equipment; an on-board charger connected to the transceiver; and a high-voltage battery charged based on control by the on-board charger, wherein the on-board charger is configured to exchange information, associated with discharging of the high-voltage battery, with the supply equipment via the transceiver and the access point.

The information associated with discharging of the high-voltage battery may include a message associated with a discharging request notifying a state where charging of an electric energy storage device of the supply equipment is needed, for supplying power of a specific zone, the message being a message received from the supply equipment via the access point.

The information associated with discharging of the high-voltage battery may include: a message requesting a discharging time taken in discharging the high-voltage battery to a target depth of discharge needed for the supply equipment, the message being a message received from the supply equipment via the access point; and information associated with the discharging time, the information being information transferred to the supply equipment via the access point.

The information associated with discharging of the high-voltage battery may include: a message requesting discharging power capable of being provided from the high-voltage battery, the message being a message received from the supply equipment via the access point; and information associated with the discharging power and transferred to the supply equipment via the access point.

The information associated with discharging of the high-voltage battery may include information associated with a discharging performance state representing discharging start, in discharging, and discharging completion.

It is to be understood that both the foregoing general description and the following detailed description of the present invention are exemplary and explanatory and are intended to provide further explanation of the invention as claimed.

Other features and aspects will be apparent from the following detailed description, the drawings, and the claims.

DETAILED DESCRIPTION OF THE INVENTION

Figure 1:
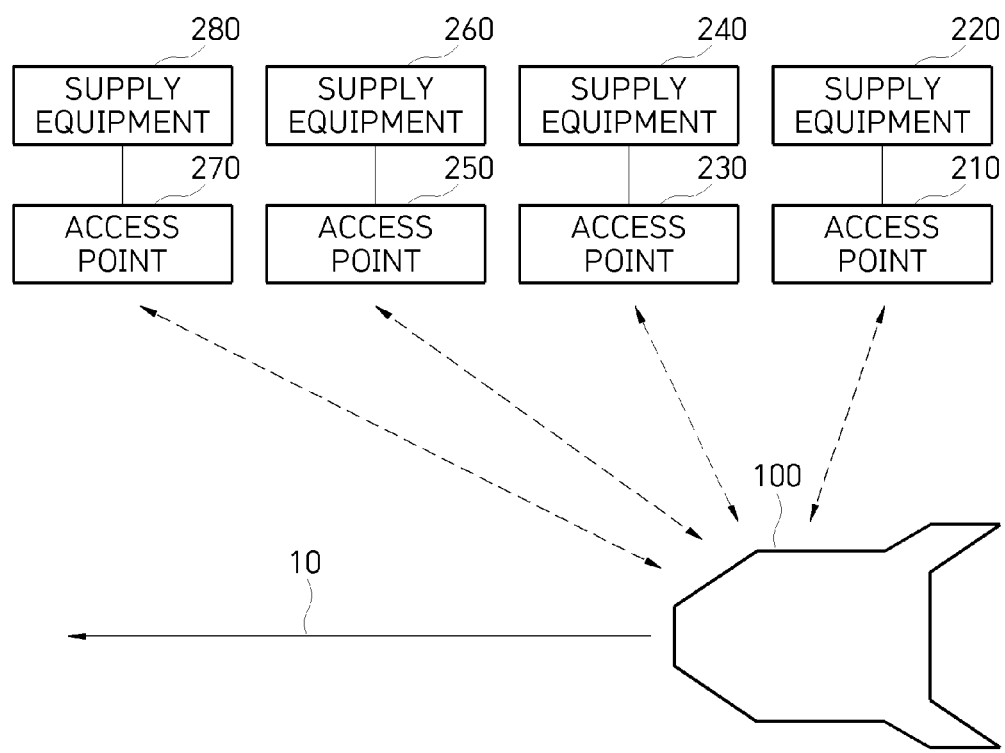
FIG. 1 is a block diagram illustrating a UAM system according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

FIG. 1 is a block diagram illustrating a UAM system according to an embodiment of the present invention.

Referring to FIG. 1, the UAM system according to an embodiment of the present invention may include an electric air vehicle (EAV) 100, a plurality of APs 210, 230, 250, and 270, and a plurality of supply equipment (SEs) 220, 240, 260, and 280.

The EAV 100 may be, for example, a drone which carries small cargos by using electric power or a medium and large-sized air vehicle which carries a plurality of passengers including pilots and occupants by using electric power.

The EAV 100 may perform vertical takeoff or landing and horizontal cruising by using a plurality of rotors which are driven based on distributed electric propulsion (DEP). Here, the DEP may be technology which independently drives a plurality of rotors with electric energy supplied from one high-voltage battery.

The present invention may not be characterized in DEP, and thus, detailed descriptions of the DEP and a structure of the EAV 100 to which the DEP is applied may be replaced by known technology (for example, descriptions of "vertical takeoff air mobility" disclosed in the patent document "Korean Patent Application No. 10-2020-0001066").

The plurality of APs 210, 230, 250, and 270 may perform wireless communication with the EAV 100 for controlling a movement path (a flight path) of the EAV 100. The wireless communication between the plurality of APs 210, 230, 250, and 270 and the EAV 100 may be, for example, long term evolution (LTE), $4^{th}$ generation (4G) communication, or $5^{th}$ generation (5G) communication.

The plurality of SEs 220, 240, 260, and 280 may supply electric energy (power) to a battery (a high-voltage battery) of the EAV 100 so as to charge the EAV 100 and may exchange information associated with charging of the EAV 100.

Moreover, the plurality of SEs 220, 240, 260, and 280 may be supplied with the electric energy (power) from the battery (the high-voltage battery) of the EAV 100 so as to discharge the EAV 100 and may exchange information associated with discharging of the EAV 100.

One AP may be installed near one SE corresponding thereto. An installation place of one SE corresponding to one AP may be a place enabling the vertical takeoff of the EAV 100, and for example, may be a rooftop of a building.

In a case where an SE is supplied with the electric energy (power) from the EAV 100 so as to discharge the EAV 100, the supplied electric energy (power) may be used as power for a building where an AP is installed.

Depending on the case, when an emergency situation such as power cut occurs in a zone including a building where an AP is installed, the electric energy (power) supplied from the EAV 100 may be used as grid power of the zone.

Figure 2:
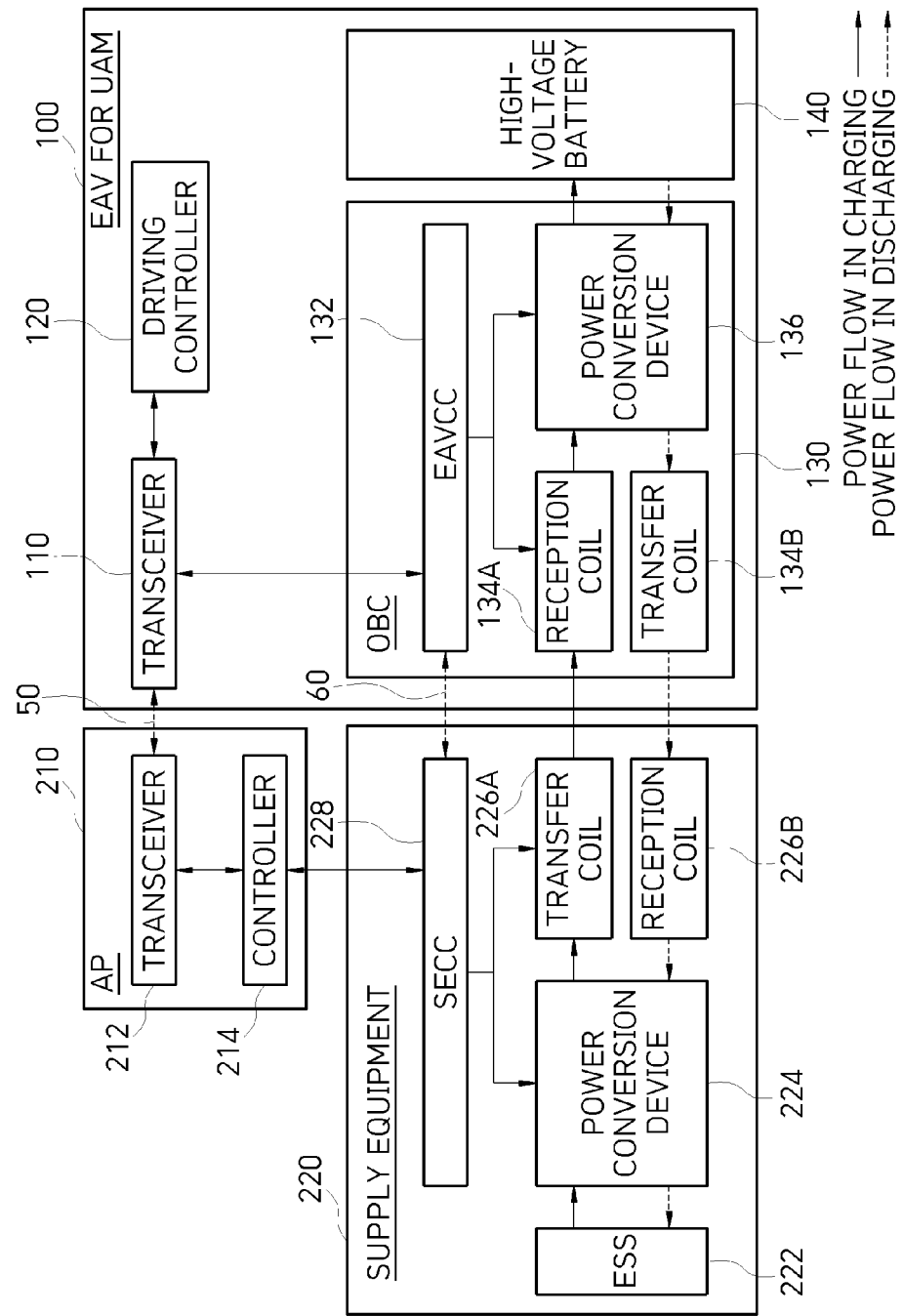
FIG. 2 is a block diagram schematically illustrating an internal configuration of an access point (AP), supply equipment, and an electric air vehicle illustrated in FIG. 2.

FIG. 2 is a block diagram schematically illustrating an internal configuration of an AP, an SE, and an EAV illustrated in FIG. 2.

Referring to FIG. 2, an AP 210 may be a device which functions as a base station and may include a transceiver 212 and a controller 214.

The transceiver 212 may communicate with the EAV 100 on the basis of a first wireless communication scheme 50. The first wireless communication scheme may be, for example, one of LTE communication, 4G communication, 5G communication, satellite communication, and combination communication thereof. Here, in the satellite communication, an EAV may communicate with an AP installed on a ground floor by using an artificial satellite as a medium. The transceiver 212 may be implemented with, for example, hardware elements having functions such as amplification, modulation, demodulation, and filtering of a signal for wireless communication.

The controller 214 may control an overall operation of the transceiver 212 and may include at least one central processing unit (CPU) and memory, and moreover, may be connected to a supply equipment communication controller (SECC) 228 embedded in the below-described SE 220 on the basis of a wired/wireless scheme.

The controller 214 may transmit, to the EAV 100 through the transceiver 212, various information, messages, or data which are transferred from the SECC 228 so as to control a movement path of the EAV 100 and control discharging/charging.

Moreover, the controller 214 may receive various information, messages, or data which are received from the EAV 100 through the transceiver 212 so as to control a movement path of the EAV 100 and control discharging/charging and may transfer the received some information to the SECC 228 embedded in the below-described SE 220.

The SE 220 may include an energy storage system (ESS) 222, a power conversion device 224, transfer/reception coils 226A and 226B, and the SECC 228.

The ESS 222 may be a device which stores electric energy (hereinafter referred to as power) generated through generating of new renewable energy using thermal power or nuclear power and sunlight and wind power and stores power received from the EAV 100.

In the present invention, in a case where the high-voltage battery 140 embedded in the EAV 100 is used as grid power, the ESS 222 may be a rechargeable ESS (RESS) for storing power received from the EAV 100.

The power conversion device 224 may be a bidirectional power converter which boosts or drops power transferred from the ESS 222 for forward power transfer (FPT) and boosts or drops power transferred from the EAV 100 for reverse power transfer (TPT).

FPT may denote transfer of power from the SE 220 to the EAV 100, and RPT may denote transfer of power from the EAV 100 to the SE 220. Here, RPT may denote transfer of power from the EAV 100 to home, a load, and a grid included in a zone defined with respect to a position where the AP 210 is installed.

In FIG. 2, FPT is illustrated by a unidirectional arrow of a thick solid line representing power flow in charging, and RPT is illustrated by a unidirectional arrow of a thick dotted line representing power flow in discharging.

The transfer coil 226A may transfer power, converted by the power conversion device 224, to a reception coil 134A embedded in the EAV 100 on the basis of a wireless power transfer scheme. The reception coil 226B may be supplied with power from a transfer coil 134B embedded in the EAV 100 on the basis of the wireless power transfer scheme.

The wireless power transfer scheme may include, for example, inductive power transfer (MF-WPT) which transfers electric energy through a magnetic field, capacitive power transfer (EF-WPT) which transfers electric energy through an electric field, microwave power transfer (MW-WPT) which transfers electric energy through an electromagnetic wave of 1 GHz to 300 GHz, and infrared power transfer (IR-WPT) which transfers electric energy through an electromagnetic wave of 300 GHz to 400 THz.

The SECC 228 may communicate with the controller 214 embedded in the AP 210 on the basis of a wired/wireless scheme and may exchange various information, messages, and data. associated with charging/discharging, with an electric air vehicle communication controller (EAVCC) 132 of the EAV 100 described below on the basis of a second wireless communication scheme 60.

Moreover, the SECC 228 may exchange some information, associated with charging/discharging, with the EAVCC 132 through the AP 212. Here, the some information may be information associated with charging/discharging reservation.

The second wireless communication scheme may be, for example, close-distance wireless communication and may be bidirectional digital communication using a protocol, a message, a physical layer, and a data link layer.

The SECC 226 of the SE 220 and the EAVCC 132 of the EAV 100 may use, for example, a wireless local area network (WLAN) of a 2.4 GHz and 5 GHz band designated in IEEE Std 802.11, for wireless communication.

The SECC 226 may control an operation of the power conversion device 224 on the basis of various information and messages exchanged with the EAVCC 132 of the EAV 100.

For example, the SECC 226 may control a switching operation of a switching means (not shown in FIG. 2) which connects the power conversion device 224 to the transfer coil 226A.

Moreover, the SECC 226 may control a switching operation of a switching means (not shown in FIG. 2) which connects the power conversion device 224 to the reception coil 226B.

The EAV 100 may include a transceiver 110, a driving controller 120, an on-board charger (OBC) 130, and a high-voltage battery 140.

The transceiver 110 may communicate with a transceiver 212 of the AP 212 on the basis of a first wireless communication scheme 50.

The driving controller 120 may control a movement (flight) of the EAV 100 on the basis of various movement control information exchanged with the AP 212 through the transceiver 110. For example, the driving controller 120 may control a movement speed (a flight speed) of the EAV 100 on the basis of movement limit speed information received from the AP 212.

The OBC 130 may include an EAVCC 132, transfer/reception coils 134A and 134B, and a power conversion device 136.

The reception coil 134A may receive power from the transfer coil 226A of the SE 220 on the basis of a wireless power transfer scheme.

The transfer coil 134B may transfer power, transferred from the high-voltage battery 140, to the reception coil 226B of the SE 220 through the power conversion device 136 on the basis of the wireless power transfer scheme.

The power conversion device 136 may rectify alternating current (AC) power transferred through the reception coil 134A, convert the rectified AC power into direct current (DC) power, and boost and/or drop the converted DC power.

Moreover, the power conversion device 136 may boost and/or drop the DC power transferred from the high-voltage battery 140 and may transfer the boosted or dropped DC power to the transfer coil 134B, and the transfer coil 134B may transfer the DC power to the reception coil 226B of the SE 220.

The power conversion device 136 may be referred to as a bidirectional power converter, like the power conversion device 224 of the SE 220 described above.

The high-voltage battery 140 may be an energy storage device which is charged with power transferred from the power conversion device 136 in charging, and contrariwise, transfers the charged power to the SE 220 through the power conversion device 136 and the transfer coil 134B in discharging.

The EVACC 132 may exchange various information, messages, or data, associated with charging/discharging, with the SECC 228 on the basis of a second wireless communication scheme 132 and may exchange some information, associated with charging/discharging, with the SECC 228 through the transceiver 110 and the AP 210. Here, the some information may be information associated with charging/discharging reservation.

Moreover, the EVACC 132 may control an operation of the power conversion device 136 on the basis of various information and messages exchanged with the SECC 228.

For example, the EVACC 132 may control a switching operation of a switching means (not shown in FIG. 2) which connects a switching means (not shown in FIG. 2) of the power conversion device 136 or the power conversion device 136 to the transfer/reception coils 226A and 226B.

Hereinafter, information exchanged between the AP 210 and the EAV 100 on the basis of the first wireless communication scheme so as to control a movement path of the EAV 100 and information exchanged between the SECC 228 of the SE 220 and the EAVCC 132 of the EAV 100 on the basis of the second wireless communication scheme so as to charge/discharge the high-voltage battery 140 embedded in the EAV 100 will be described.

The following Table 1 may define information transferred from the AP 210 to the EAV 100 so as to control a movement path of the EAV 100.

AP, and then, may transfer the received movement permission information to the EAV 100.

The occupation information may be information representing a state where another EAV or a previous EAV occupies the landing point or a state where another EAV or a previous EAV occupies a movement interval between adjacent APs.

The landing point may be a point located at a certain distance from an AP. The point located at a certain distance from the AP may be a point at which the transfer coil 226A or the reception coil 226B of the SE 220 is installed. The transfer coil or the reception coil may be installed at a ground floor at which another EAV or a previous EAV lands.

An occupation state of the landing point may denote a state where another EAV or a previous EAV lands at a landing point for charging/discharging, and an occupation state of the movement interval may denote a state where another EAV or a previous EAV is moving (flying) in the movement interval.

Moreover, the occupation information may be information representing a state where another EAV or a previous EAV is communication-connected to a corresponding AP. That is, the occupation information may be information representing a state where communication between another EAV and a corresponding AP is connected in a state where the other EAV or a previous EAV enters a communication range (coverage) of the corresponding AP.

Moreover, the occupation information may be position information about another EAV or a previous EAV. The position information may be determined based on position information about where a corresponding AP is installed in a state where the other EAV or a previous EAV is commu-

TABLE 1

| Information or message | Transfer object | Reception object | Content | State flag | Transfer period |
|---|---|---|---|---|---|
| Access permission | AP | EAV | Communication access permission | 0/1 | 100 ms |
| Movement permission | AP | EAV | Movable to AP | 0/1 | 100 ms |
| Occupation information | AP | EAV | Previous EVA occupies a landing point, or occupies a movement interval between AP1 an AP2 | 0/1 | 100 ms |
| Movement limit speed | AP | EAV | Movement speed limit for each AP interval | 0: 100 km/h<br>1: 80 km/h<br>2: 60 km/h<br>3: 40 km/h<br>4: 20 km/h<br>5: stop | 100 ms |
| Movement distance between Aps | AP | EAV | Movement distance between AP1 and AP2 | 0~2555 km, 10 km, 20 km, 30 km | 100 ms |
| AP fault | AP | EAV | State flag representing fault sensed in AP | 0/1 | 100 ms |

Pieces of information defined in Table 1 may be generated by the controller 214 of the AP 210 and may be transferred to the EAV 100 through the transceiver 212.

Information associated with 'movement permission' (hereinafter referred to as movement permission information) may be information representing that the EAV 100 is movable from a place, where a current AP is installed, to a place where a next AP is installed.

The movement permission information may be transferred from the current AP or the next AP to the EAV 100. In a case where the current AP transfers the movement permission information to the EAV 100, the current AP may receive the movement permission information from the next nication-connected to the corresponding AP. The controller 214 of the AP 210 may calculate position information on the basis of position information about the AP, which is previously set.

Moreover, the occupation information may be information representing a state where alignment between the transfer coil 226A of the SE 220 and the reception coil 134A of the EAV 100 is completed or a state where alignment between the reception coil 226B of the SE 220 and the transfer coil 134B of the EAV 100 is completed. The controller 214 of the AP 210 may receive information representing an alignment state between coils through the SECC 228 of the SE 220 or another communication interface (not shown in FIG. 2) of the SE 220, so as to generate occupation information on the basis of an alignment state between coils. In this case, the controller 214 of the AP 210 may receive information representing an alignment state between coils from the SECC 228 of the SE 220 on the basis of a wired/wireless communication scheme.

Moreover, the occupation information may be information representing whether another EAV is using the SE 220 connected to the AP 210. That is, the occupation information may be information representing whether another EAV occupies the SE 220 for charging (in use). The AP 210 may receive state information, representing that the SE 220 is being used (charged) by a previous EAV, from the SE 220 and may generate the occupation information on the basis of the received state information.

Information associated with 'movement limit speed' (hereinafter referred to as movement speed limit information) may be information for limiting a movement speed of the EAV 100 for each interval between APs.

The controller 120 of the EAV 100 may control driving of a plurality of rotors on the basis of movement speed limit information received from an AP to control movement of the EAV 100.

Movement speed limit information about the EAV 100 may be determined based on a current position of a previous EAV, and a determination method thereof will be described below with reference to FIGS. 3A to 3C.

FIGS. 3A to 3D are conceptual diagrams for describing a method of determining a movement limit speed of an EAV 100 according to an embodiment of the present invention.

Figure 3A:
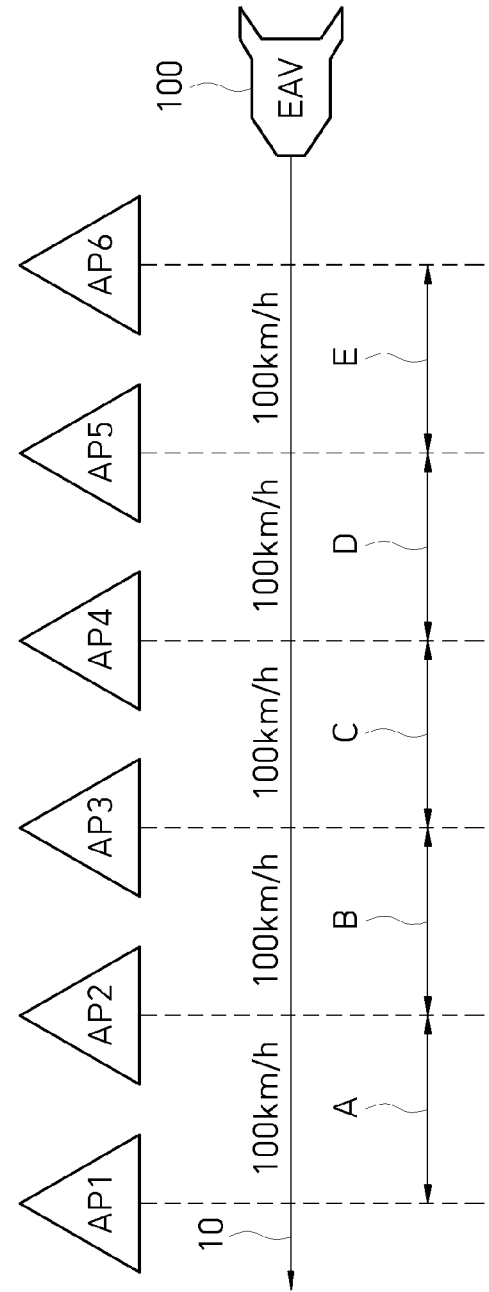
FIGS. 3A, 3B, 3C, and 3D are conceptual diagrams for describing a method of determining a movement limit speed of an electric air vehicle (EAV) according to an embodiment of the present invention.

First, referring to FIG. 3A, when there is no previous EAV in a movement path 10 of the EAV 100, movement limit speeds of all intervals A, B, C, D, and E between APs (AP1 to AP6) may be determined to be the same maximum movement limit speed (for example, 100 km/h).

The EAV 100 may move along the movement path 10 at the maximum movement limit speed (for example, 100 km/h) received from the APs (AP1 to AP6).

Figure 3B:
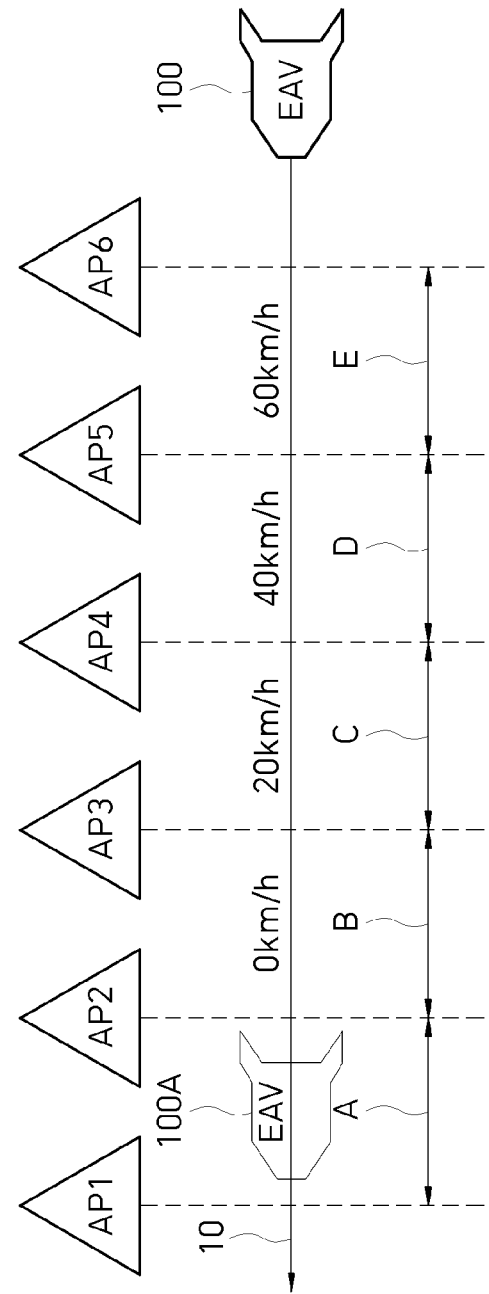

Referring to FIG. 3B, when a previous EAV 100A is in the movement path 10 of the EAV 100, for example, when the previous EAV 100A moves in a movement interval A between the AP1 and the AP2 or lands at a landing point close to a point at which the AP2 is installed, a movement limit speed of the EAV 100 for each interval may decrease toward a current position of the previous EAV 100A. For example, movement limit speeds of movement intervals B, C, D, and E may be respectively determined to be 0 km/h, 20 km/h, 40 km/h, and 60 km/h.

As described above, based on a movement limit speed which decreases as the EAV 100 moves in a direction from the movement interval E to the movement interval B, the EAV 100 may avoid a collision with the previous EAV 100A located in the movement interval A between the AP1 and the AP2 or at a landing point near a point at which the AP2 is installed.

Furthermore, 0 km/h determined in the movement interval B which is the most adjacent to the movement interval A of the previous EAV 100A may denote that the previous EAV 100A should maintain a standby state at a landing point near a point, at which the AP3 is installed, before until the previous EAV 100A deviates from the movement interval A.

In order to determine a movement limit speed of each movement interval, the APs (AP1 to AP6) may share occupation information. For example, when the previous EAV 100A is located in the movement interval A between the AP1 and the AP2, the AP1 or the AP2 may transfer the occupation information to the AP3 to the AP6, calculate a movement limit speed of each movement interval on the basis of the occupation information received from the AP1 or the AP2, and transfer the calculated movement limit speed to the EAV 100.

For example, the AP4 may determine whether the previous EAV 100A occupies the SE of the AP1 or the AP2 on the basis of the occupation information received from the AP1 or the AP2 and may determine whether the EAV 100A is moving in a movement interval between the AP1 and the AP2, and thus, may calculate a movement limit speed of the movement interval C or D where the AP4 is located, on the basis of a predefined rule.

Figure 3C:
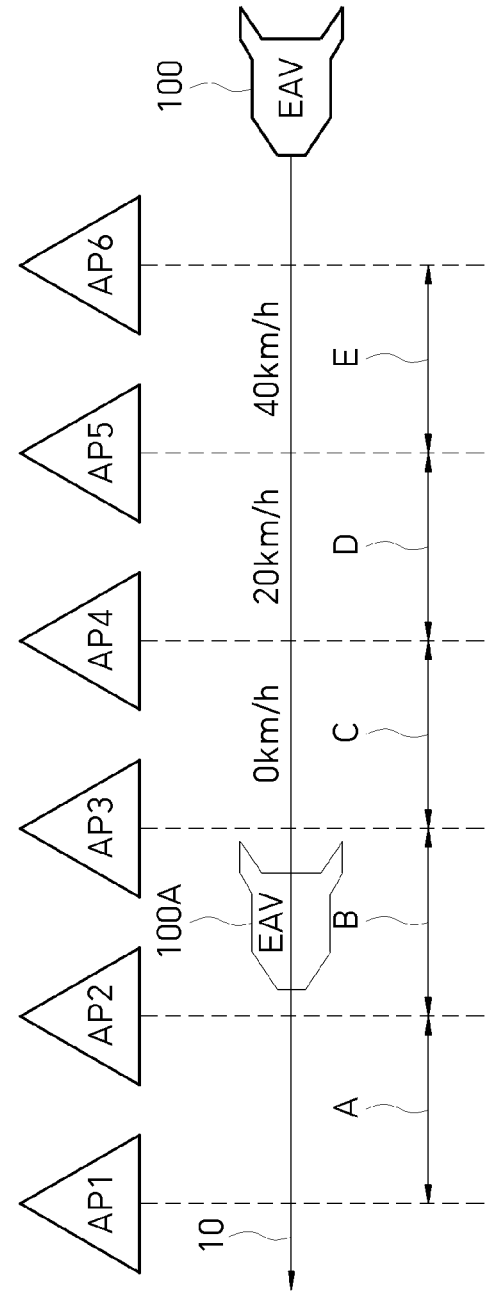

Referring to FIG. 3C, unlike FIG. 3B, when the previous EAV 100A is located in the movement interval B instead of being located in the movement interval A, movement limit speeds of the movement intervals C, D, and E of the EAV 100 may be respectively determined to be 0 km/h, 20 km/h, and 40 km/h.

Figure 3D:
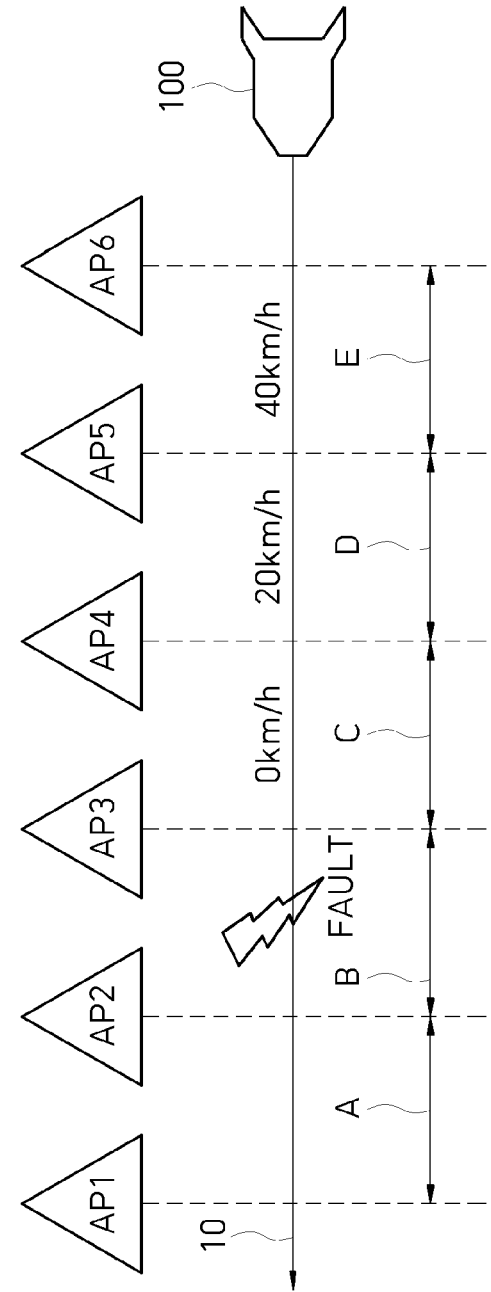

Referring to FIG. 3D, when a previous EAV is not in the movement path 10 of the EAV 100 and a communication fault or a communication error occurs in at least one of the AP2 and the AP3 defining the movement interval B, movement limit speeds of the movement intervals C, D, and E may be respectively determined to be 0 km/h, 20 km/h, and 40 km/h.

In order to determine a movement limit speed of each movement interval when a communication fault or a communication error occurs, the AP1 to the AP6 may share identification information about an AP where a fault occur. For example, the AP2 and/or the AP3 where a fault occurs may transfer fault information and identification information thereof to the AP1, the AP4, the AP5, and the AP6.

The following Table 2 may define information which is transferred from the transceiver 110 of the EAV 100 to the transceiver 212 of the AP 210, so as to control a movement path of the EAV 100.

TABLE 2

| Information | Transfer object | Reception object | Content | State flag | Transfer period |
|---|---|---|---|---|---|
| Movement permission request | EAV | AP | Request movement permission for moving to next movement interval | 0/1 | 100 ms |
| Occupation information request | EAV | AP | Request information representing occupation state of landing point or movement interval | 0/1 | 100 ms |
| Movement limit speed request | EAV | AP | Request same or different movement limit speed information about each movement interval | 0: 100 km/h<br>1: 80 km/h<br>2: 60 km/h<br>3: 40 km/h<br>4: 20 km/h<br>5: stop | 100 ms |
| Movement distance request | EAV | AP | Movement distance from start point to destination | 0/1 | 100 ms |

Pieces of information defined in Table 2 may be generated by the controller 120 of the EAV 100.

Information associated with 'movement permission request' may be a message which requests permission of movement from a current movement interval to a next movement interval.

The EAV 100 may receive a response message representing the permission or not of movement in response to a movement permission request message from the AP.

Information associated with 'occupation information request' may be a message which requests information representing whether a previous EAV or another EAV is using an SE cooperating with an AP or is moving in a movement interval between APs.

Information associated with 'movement limit speed request' may be a message which requests a movement limit speed value determined to be equal or different for each movement interval.

Information associated with 'movement distance request' may be a message which requests a movement distance from a start point of the EAV 100 to a destination of the EAV 100. The EAV 100 may receive a distance value of each movement interval from each AP as a response message of a movement distance request message and may summate distance values of the movement intervals to calculate a total movement distance.

The following Tables 3 and 4 may define pieces of information exchanged between the EAVCC 132 of the EAV 100 and the AP 210 or the SECC 228 of the SE 220 cooperating with the AP 210, so as to charge the high-voltage battery 140 embedded in the EAV 100.

TABLE 3

| Information | Transfer object | Reception object | State flag | Transfer period |
|---|---|---|---|---|
| Wireless communication setup | SECC | EAVCC | 0/1 | 100 ms |
| Use permission/not permission | SECC(via AP) | EAVCC | 0/1 | 100 ms |
| Standby time | SECC(via AP) | EAVCC | 0~255 | 100 ms |
| Charging reservation completion | SECC(via AP) | EAVCC | 0/1 | 100 ms |
| Charging start | SECC | EAVCC | 0/1 | 100 ms |
| In charging | SECC | EAVCC | 0/1 | 100 ms |
| Charging completion | SECC | EAVCC | 0/1 | 100 ms |
| Fault state notification | SECC | EAVCC | 0, 1, 2, 3 | 100 ms |

Pieces of information defined in Table 3 may be generated by the SECC 228 of the SE.

Information associated with 'wireless communication setup' may conform with wireless communication setup between an EVCC and an SECC defined in standard documents ISO15118-1 and ISO15118-2.

Information associated with 'use permission and not permission' may be information which is transferred to the EAVCC 132 embedded in the EAV 100 through the AP 210 and may be a message representing the use permission of the SE 220.

Information associated with 'standby time' may be information which is transferred to the EAVCC 132 embedded in the EAV 100 via the AP 210 and may be information including a charging standby time for the use of the SE 220. Standby time information may be, for example, a time value of a minute unit such as 5 min, 10 min, 20 min, and 30 min.

Information associated with 'reservation completion' may be information which is transferred to the EAVCC 132 embedded in the EAV 100 through the AP 210 and may be a message which notifies the EAVCC 132 that charging reservation is completed.

Information associated with 'charging start' may include information representing a charging performance state associated with a charging start of the high-voltage battery 140 equipped in the EAV 100.

Information associated with 'in charging' may include information representing a charging performance state associated with a state of charge (SOC) of the high-voltage battery 140 equipped in the EAV 100.

Information associated with 'charging completion' may include information representing a charging performance state associated with the charging completion of the high-voltage battery 140 equipped in the EAV 100. Here, information associated with charging completion may include information representing a charging performance state associated with forced end when charging is forcibly ended before the high-voltage battery 140 reaches a target depth of charge, on the basis of a request of a user (a passenger of an EAV).

Information associated with 'use permission/not permission', 'standby time', and 'charging reservation completion' may be information associated with 'charging reservation', and information associated with 'charging start', 'in charging', and 'charging completion' may be information associated with a charging performance state.

Information associated with 'charging completion' may be a message including information representing a fault state of the SE 220 and may further include information representing a fault state of the AP 210 when the AP 210 is connected to the SE 220 by wire or wirelessly.

TABLE 4

| Information | Transfer object | Reception object | State flag | Transfer period |
|---|---|---|---|---|
| Wireless communication setup | EVACC | SECC | 0/1 | 100 ms |
| Use permission request | EVACC | SECC(via AP) | 0/1 | 100 ms |
| Standby time request | EVACC | SECC(via AP) | 0~255 | 100 ms |
| Charging reservation request | EVACC | SECC(via AP) | 0/1 | 100 ms |
| Charging start request | EVACC | SECC | 0/1 | 100 ms |
| Charging end request | EVACC | SECC | 0/1 | 100 ms |
| Fault state notification | EVACC | SECC | 0, 1, 2, 3 | 100 ms |

Pieces of information defined in Table 4 may be generated by the EAVCC 132 of the EAV.

Information associated with 'wireless communication setup' may conform to information associated with the wireless communication setup of Table 3.

Information associated with 'use permission request' may be a message which requests the use permission of the SE 220 and may be transferred to the SECC 228 of the SE 220 via the AP 210.

Information associated with 'standby time request' may be a message which requests a standby time for the use of the SE 220 and may be transferred to the SECC 228 of the SE 220 via the AP 210.

Information associated with 'reservation request' may be a message (charging reservation request message) which requests charging reservation, may include information such as a charging reservation time and a target depth of charge, and may be transferred to the SECC 228 of the SE 220 via the AP 210.

Information associated with 'charging start request' may be a message which requests the start of charging in a state where charging between the SE 220 and the EAV 100 is ready.

Information associated with 'charging end request' may be a message which requests the end of charging after or before the high-voltage battery 140 reaches the target depth of charge.

The following Tables 5 and 6 may define pieces of information exchanged between the EAVCC 132 of the EAV 100 and the AP 210 or the SECC 228 of the SE 220, so as to discharge the high-voltage battery 140 embedded in the EAV 100 (i.e., use the high-voltage battery 140 as grid power).

TABLE 5

| Information | Transfer object | Reception object | State flag | Transfer period |
|---|---|---|---|---|
| Wireless communication setup | SECC | EVACC | 0/1 | 100 ms |
| Discharging request | SECC (via AP) | EVACC | 0/1 | 100 ms |
| Discharging time request | SECC (via AP) | EVACC | 0~255 | 100 ms |
| Discharging power request | SECC (via AP) | EVACC | 0~255 | 100 ms |
| Discharging start request | SECC | EVACC | 0/1 | 100 ms |
| Discharging end request | SECC | EVACC | 0/1 | 100 ms |
| Fault state notification | SECC | EVACC | — | 100 ms |

Pieces of information defined in Table 5 may be pieces of information which are generated by the SECC 228 of the SE and are usable in a discharging scenario for supplying power by using the high-voltage battery 140 embedded in the EAV 100 at a building or a specific zone including the building.

Information associated with 'wireless communication setup' may conform to information associated with the wireless communication setup of Table 3.

Information associated with 'discharging request' may be a notification message for notifying the EAV 100 that charging of the ESS 222 is needed for supplying power to a building or a specific zone and may be transferred to the EAVCC 132 embedded in the EAV 100 via the AP 210.

Information associated with 'discharging time request' may be a target depth of discharge needed for the SE 220, may be a message which requests a time taken in discharging the high-voltage battery 140, and may be transferred to the EAVCC 132 embedded in the EAV 100 via the AP 210.

Information associated with 'discharging power request' may be a message which requests discharging power (kVA) capable of being provided by the EAV 100 and may be transferred to the EAVCC 132 embedded in the EAV 100 via the AP 210.

Information associated with 'discharging start request' may be a message which requests the start of discharging (discharging start command).

Information associated with 'discharging end request' may be a message which requests the end of discharging (discharging end command). Here, discharging end may include forced end which does not consider a target depth of discharge.

Information associated with 'fault state notification' may be a message which notifies a fault state of the SECC 228.

TABLE 6

| Information | Transfer object | Reception object | State flag | Transfer period |
|---|---|---|---|---|
| Wireless communication setup | EVACC | SECC | 0/1 | 100 ms |
| Discharging time | EVACC | SECC(via AP) | 0~255 | 100 ms |
| Discharging power | EVACC | SECC(via AP) | 0~255 | 100 ms |
| Discharging start | EVACC | SECC | 0/1 | 100 ms |
| In discharging | EVACC | SECC | 0/1 | 100 ms |
| Discharging completion | EVACC | SECC | 0/1 | 100 ms |
| Fault state notification | EVACC | SECC | — | 100 ms |

Pieces of information defined in Table 6 may be generated by the EAVCC 132 embedded in the EAV 100.

Information associated with 'wireless communication setup' may conform to information associated with the wireless communication setup of Table 3.

Information associated with 'discharging time' may be a target depth of discharge needed for the SE 220 on the basis of a current capacity of the high-voltage battery 140, may include information including time information for discharging the high-voltage battery 140, and may be transferred to the SECC 228 embedded in the SE 220 via the AP 210 and the transceiver 110 embedded in the EAV 100.

Information associated with 'discharging power' may include information including discharging power (kVA) capable of being provided by the EAV 100 and may be transferred to the SECC 228 embedded in the SE 220 via the AP 210 and the transceiver 110 embedded in the EAV 100.

Information associated with 'discharging start' may be a message which notifies the start of discharging.

Information associated with 'in discharging' may include information representing a discharging performance state. Here, the discharging performance state may be a depth of discharge (DOD) which is an opposite concept of an SOC.

Information associated with 'discharging completion' may be a message which notifies discharging completion when a depth of discharge of the high-voltage battery 140 reaches a target depth of discharge needed for the SE 220. Here, the information may be a message which notifies the end of discharging when discharging ends before discharging of the high-voltage battery reaches a target depth of discharge, on the basis of a request of a manager of the SE 220.

Information associated with 'discharging start', 'in discharging', and 'discharging end' may be information representing a discharging performance state.

Information associated with 'fault state notification' may be a message which notifies a fault state of the EVACC 132.

Figure 4:
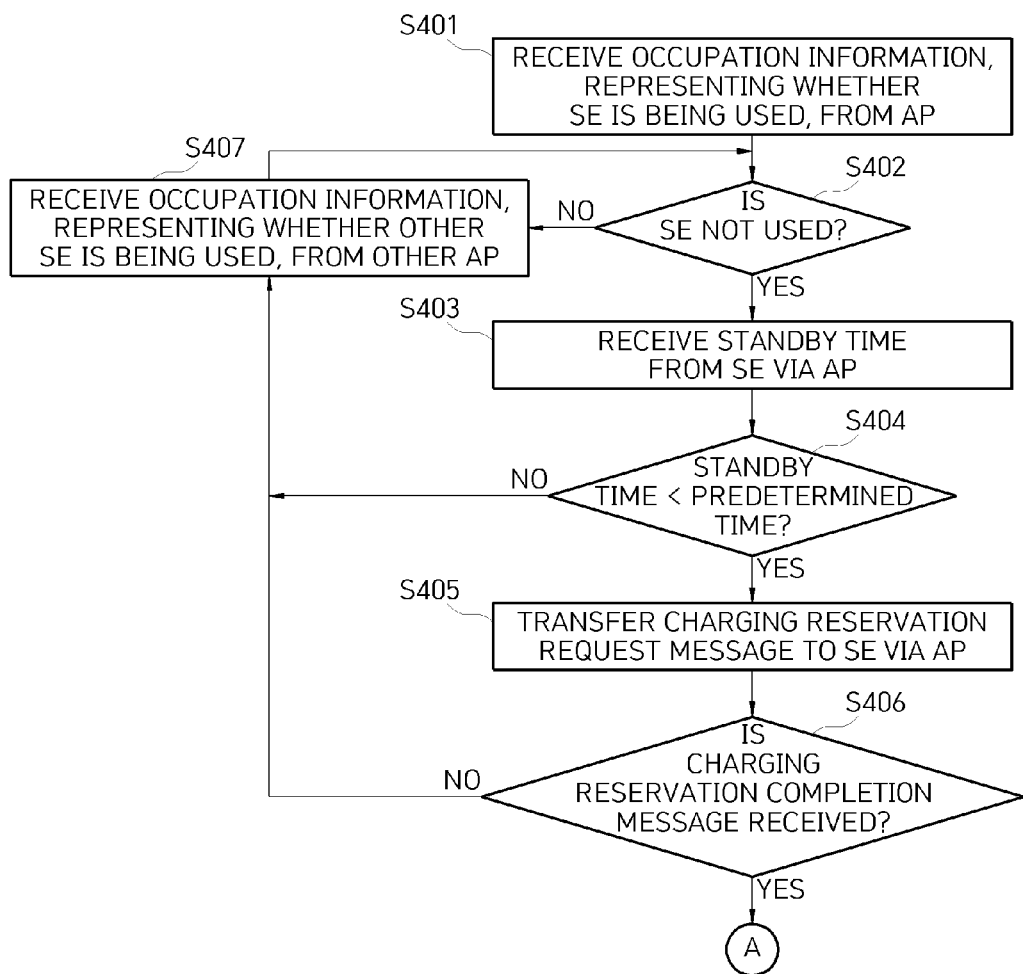
FIGS. 4 and 5 are flowcharts illustrating a charging method of a high-voltage battery embedded in an electric air vehicle according to an embodiment of the present invention.
Figure 5:
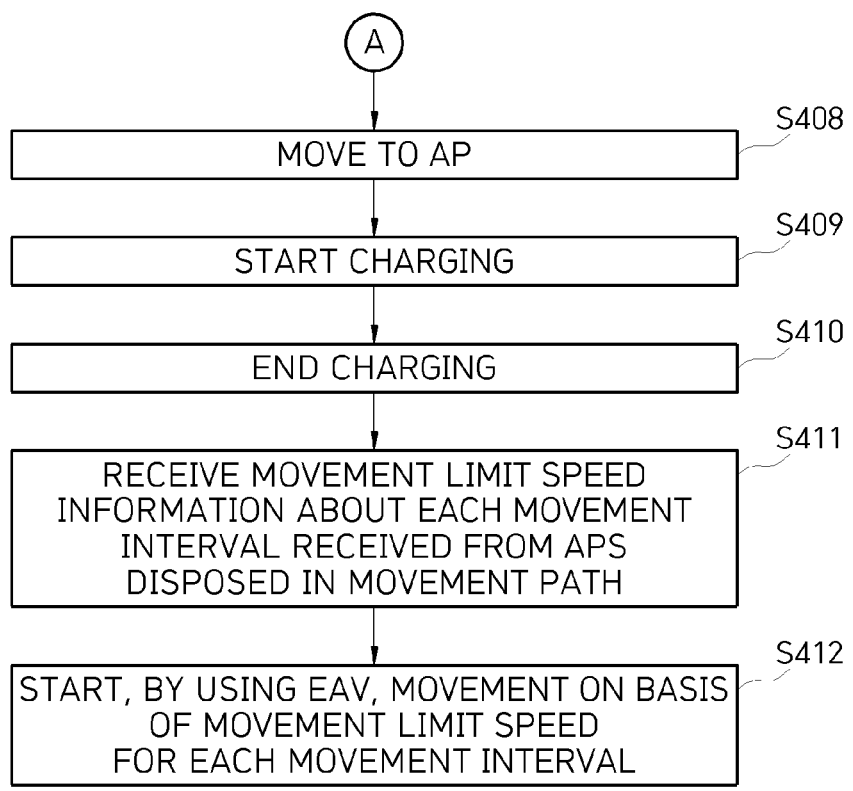

FIGS. 4 and 5 are flowcharts illustrating a charging method of a high-voltage battery embedded in an EAV according to an embodiment of the present invention.

To help understand the charging method, the charging method will be described below with reference to FIGS. 4 and 5 in conjunction with FIG. 2. Also, it may be assumed that a main element for performing each of the following steps is the OBC 130 or the EAVCC 132 embedded in the OBC 130.

First, referring to FIG. 4, in step S401, the OBC 130 may receive occupation information from the AP 210 via the transceiver 110.

The occupation information, as described above, may be state information representing whether another EAV occupies (use) the SE 220 cooperating with the AP 210 for charging or discharging, or may be state information representing whether the other EAV is moving in a movement interval between APs. That is, the occupation information may be information representing whether another EAV occupies the SE 220 for charging (in use). Occupation information representing that another EAV occupies (use) the SE 220 may be based on state information which is provided to the AP by the SECC 228 of the SE 200 and represents that charging/discharging is being performed.

Subsequently, in step S402, the OBC 130 may determine whether the other EAV is using the SE 220, on the basis of the received occupation information. When the other EAV is using the SE 220, in step S407, the OBC 130 may receive occupation information, representing whether another SE cooperating with another AP is being used, from the other AP, and then, step S402 may be performed again.

Subsequently, in step S403, when it is checked that the other EAV does not use the SE 220, the OBC 130 may request standby time information, which should wait for using the SE 220, to the SE 220 via the transceiver 110 and the AP 212, and then, may receive the standby time information as a response message corresponding thereto, from the SE 220 via the AP 212 and the transceiver 110.

Subsequently, in step S404, the OBC 130 may compare a predetermined time (for example, 30 min) with the standby time. When the standby time is long, the EAV 100 may need to reserve charging to the other SE.

In step S405, when the standby time is less than the predetermined time, the OBC 130 may transfer a charging reservation request message to the SE 220 via the transceiver 110 and the AP 212, and when the standby time is greater than the predetermined time, step S407 may be performed.

Subsequently, in step S406, the OBC 130 may check whether a charging reservation completion message corresponding to the charging reservation request message is received from the SE 220 via the transceiver 110 and the AP 212. When the charging reservation completion message is not received, step S407 may be performed.

Subsequently, in step S408, the EAV 100 may move to the AP 220 on the basis of control by the driving controller 120, and then, may land at a landing point located near the AP 220. Here, the landing point may be a ground floor where the reception coil 226B of the SE 220 is installed.

Subsequently, in step S409, charging of the high-voltage battery 140 embedded in the EAV 100 may start based on a wireless power transfer scheme.

Subsequently, in step S410, when the high-voltage battery 140 reaches a target depth of charge, charging of the high-voltage battery 140 may end. In this case, the charging may end before the high-voltage battery 140 reaches the target depth of charge, on the basis of a user request of the EAV 100.

Subsequently, in step S411, when charging of the high-voltage battery 140 ends, the high-voltage battery 140 may receive movement limit speed information about each movement interval received from the other APs 230, 250, and 270 disposed in a movement path, on the basis of a request of the driving controller 120.

Subsequently, in step S412, the EAV 100 may start movement on the basis of the movement limit speed information about each movement interval received from the other APs 230, 250, and 270, and thus, a series of process of the charging method may be completed.

Figure 6:
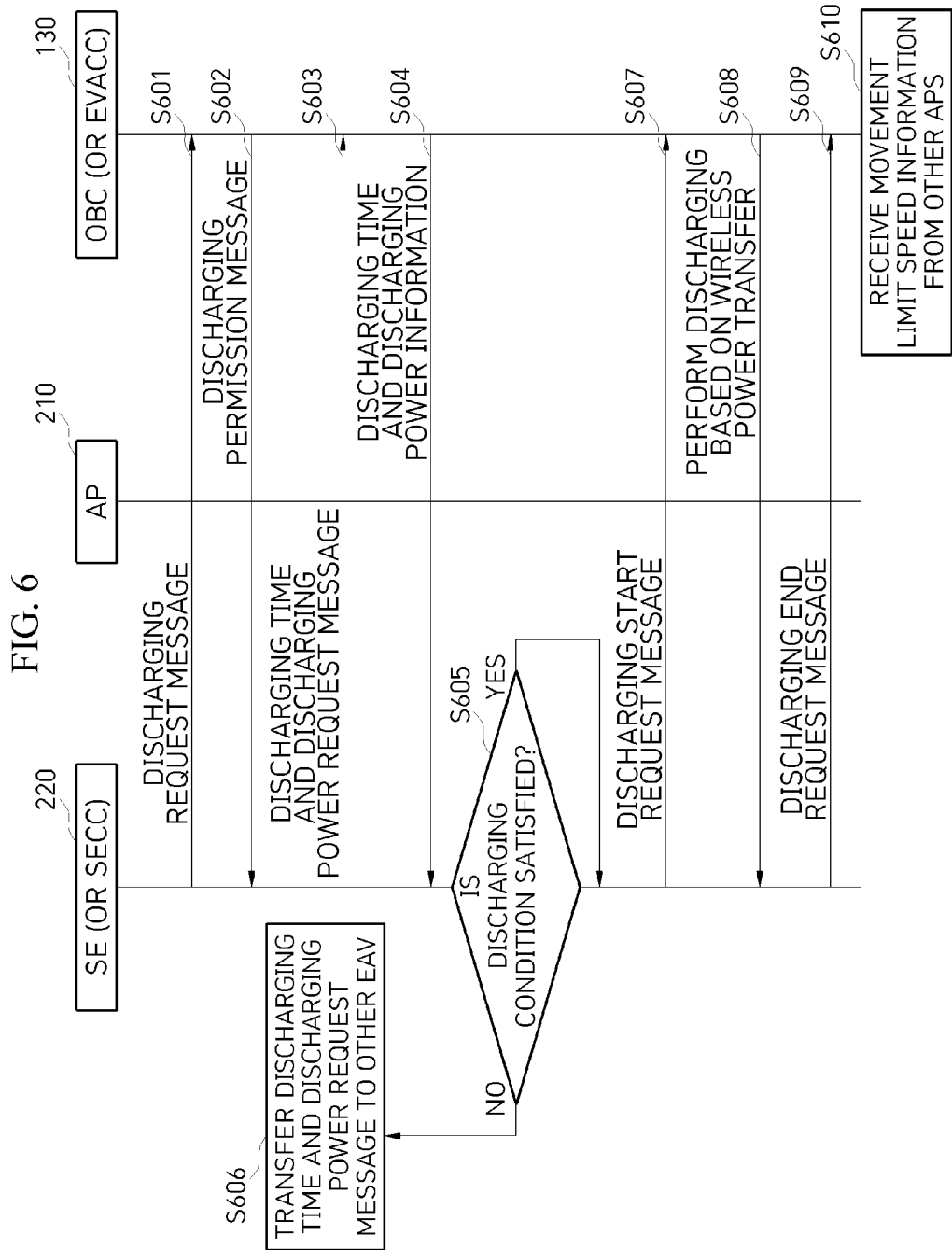
FIG. 6 is a flowchart of information exchanged between an AP, supply equipment, and an on-board charger for discharging of a high-voltage battery embedded in an electric air vehicle according to an embodiment of the present invention.

FIG. 6 is a flowchart of information exchanged between an AP, an SE, and an OBC for discharging of a high-voltage battery embedded in an EAV according to an embodiment of the present invention.

Referring to FIG. 6, in step S601, the SE 220 may transfer a discharging request message to the OBC 130 via the AP 210. Here, the discharging request message may be a message notifying a situation where it is needed to supply power to a building or a specific zone where the AP 210 or the SE 220 is installed.

Such a discharging request message may not be transferred to only the OBC 130 equipped in one EAV 100 and may be simultaneously transferred to OBCs equipped in a plurality of EAVs.

Subsequently, in step S602, when the amount of power stored in the high-voltage battery 140 is sufficient, the OBC 130 may transfer a discharging permission message to the SE 220 via the AP 210.

Subsequently, in step S603, the SE 220 may transfer a message, requesting a discharging time and discharging power, to the OBC 130 via the AP 210. The reason that the SE 220 transfers the message may be for checking whether the SE 220 satisfies a requirement condition (hereinafter referred to as a discharging condition) which is needed for discharging the high-voltage battery 140 embedded in a corresponding EAV 100.

Subsequently, in step S604, the OBC 130 may transfer information, associated with a discharging time and discharging power, to the SE 220 via the AP 210.

Here, the discharging time may be a time taken until the amount of power stored in the high-voltage battery 140 reaches a target depth of discharge needed for the SE 220, and the discharging power may be a parameter having a unit of kVA.

Subsequently, in step S605, the SE 220 may determine whether the discharging time and the discharging power received from the OBC 130 satisfy the discharging condition, in order to be supplied with smooth power in an emergency situation.

When a discharging time of the high-voltage battery 140 is greater than or equal to a predetermined time or is incapable of providing discharging power needed for the SE 220, the high-voltage battery may determine that the discharging condition is not satisfied.

When the high-voltage battery 140 does not satisfy the discharging condition, in step S606, the SE 220 may transfer the message, requesting the discharging time and the discharging power, to another EAV which has transferred a discharging permission message.

When the high-voltage battery 140 satisfies the discharging condition, the EAV 100 may move to a landing point designated by the AP 210 and may land. Here, the landing point may be a point where the reception coil 226B of the SE 220 is installed.

Subsequently, in step S607, when the EAV 100 reaches the landing point, the SE 220 may transfer a discharging start request message to the OBC 130. In this case, the discharging start request message may not pass through the AP 210 and may be directly transferred to the OBC 130 on the basis of the second wireless communication scheme (for example, a wireless local area network (WLAN) designated in IEEE Std 802.11) set between the SECC 228 of the SE 220 and an EAVCC of the OBC 130.

Subsequently, in step S608, discharging may be performed based on the wireless transfer of power from the high-voltage battery 140 to the ESS 222 of the SE 220.

Subsequently, in step S609, when a depth of discharge supplied from the high-voltage battery 140 reaches a target depth of discharge, the SE 220 may transfer a discharging end request message to the OBC 130. The OBC 130 may end discharging on the basis of the discharging end request message.

Subsequently, in step S610, when charging of the high-voltage battery 140 ends, the high-voltage battery 140 may receive movement limit speed information about each movement interval received from the other APs 230, 250, and 270 disposed in a movement path, on the basis of a request of the driving controller 120, and a series of process associated with discharging of the high-voltage battery may be completed by starting movement on the basis of the received movement limit speed information about each movement interval.

As described above, according to the embodiments of the present invention, pieces of information exchanged between supply equipment, an AP, and an OBC embedded in an EAV may be defined for movement interval control, wireless charging, and wireless discharging, and thus, a high-voltage battery embedded in the EAV may be charged and may be used as grid power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for discharging a battery of an electric air vehicle, comprising:
   a transceiver configured to perform wireless communication with an access point connected to supply equipment;
   an on-board charger connected to the transceiver; and
   a high-voltage battery configured to be charged based on control by the on-board charger,
   wherein the on-board charger is configured to exchange information associated with discharging of the high-voltage battery with the supply equipment via the transceiver and the access point, and
   wherein the information associated with discharging of the high voltage battery comprises:
   a message requesting a discharging time taken in discharging the high-voltage battery to a target depth of discharge needed for the supply equipment, the message being a message received from the supply equipment via the access point; and
   information associated with the discharging time, the information being information transferred to the supply equipment via the access point.

2. The apparatus of claim 1, wherein the information associated with discharging of the high-voltage battery comprises a message associated with a discharging request notifying a state in which charging of an electric energy storage device of the supply equipment is needed, for supplying power of a specific zone, the message being a message received from the supply equipment via the access point.

3. The apparatus of claim 1, wherein the information associated with discharging of the high-voltage battery comprises:
   a message requesting discharging power capable of being provided from the high-voltage battery, the message being a message received from the supply equipment via the access point; and
   information associated with the discharging power and transferred to the supply equipment via the access point.

4. The apparatus of claim 1, wherein the information associated with discharging of the high-voltage battery comprises information associated with a discharging performance state representing discharging start, in discharging, and discharging completion.

\* \* \* \* \*